United States Patent
Belwadi et al.

(10) Patent No.: US 8,521,581 B2
(45) Date of Patent: Aug. 27, 2013

(54) INTERACTIVE TEXT MESSAGE ADVERTISEMENTS

(75) Inventors: S. Srikanth Belwadi, Bangalore (IN); Sridhar Sundaram, Bangalore (IN); Kuan-Loong Yong, San Francisco, CA (US); Navneet Singh, Bangalore (IN); Rajiv Mathews, Bangalore (IN)

(73) Assignee: Google Inc., Mountain View, CA (US)

( * ) Notice: Subject to any disclaimer, the term of this patent is extended or adjusted under 35 U.S.C. 154(b) by 643 days.

(21) Appl. No.: 12/041,383

(22) Filed: Mar. 3, 2008

(65) Prior Publication Data

US 2009/0222341 A1 Sep. 3, 2009

(51) Int. Cl.
*G06Q 10/00* (2012.01)
*G06Q 40/00* (2012.01)

(52) U.S. Cl.
USPC ................................ 705/10; 705/35

(58) Field of Classification Search
USPC ....................................... 705/10, 35
See application file for complete search history.

(56) References Cited

U.S. PATENT DOCUMENTS

| | | | | |
|---|---|---|---|---|
| 2002/0010745 A1* | 1/2002 | Schneider | .................. | 709/206 |
| 2002/0085027 A1* | 7/2002 | Kim | .............. | 345/738 |
| 2005/0251454 A1* | 11/2005 | Wood | ............. | 705/26 |
| 2007/0061192 A1* | 3/2007 | Chew | ............... | 705/13 |
| 2008/0119132 A1* | 5/2008 | Rao | ............. | 455/3.04 |
| 2008/0133336 A1* | 6/2008 | Altman et al. | ............... | 705/10 |

FOREIGN PATENT DOCUMENTS

| WO | WO 01/89243 A1 | 11/2001 |
|---|---|---|
| WO | WO 03/015430 A1 | 2/2003 |
| WO | WO 2004/008276 A2 | 1/2004 |
| WO | WO 2007/146525 A1 | 12/2007 |

OTHER PUBLICATIONS

Anonymous; "Leading Edge: Mobile Advertising"; Mar. 2008; Marketing Magazine, pp. 5, ISSN: 0111-9044.*
Wireless_News; "ABI Research: Japan and South Korea Leading in Mobile Advertising with Newly Developed Methods"; Dec. 15, 2007; Supplier No. 172496064.*
New_Media_Age; "Fulfilment: Dominos Pizza by TXT"; Sep. 13, 2007; New Media Age, p. 40; ISSN: 1364-7776.*
PCT International Search Report and the Written Opinion, PCT/US2009/035730, Sep. 23, 2009, 10 pages.

* cited by examiner

*Primary Examiner* — Edward Chang
(74) *Attorney, Agent, or Firm* — Fish & Richardson P.C.

(57) ABSTRACT

Systems and methods for interactive text message advertising. A response parsing engine can receive a text message response from a device and can identify an indicator associated with the text message response. A text message page server can identify a selected text message page based upon the indicator associated with the response and can provide the selected text message page to the device.

23 Claims, 9 Drawing Sheets

Conversion Events

| Card Name | Conv Rate | Top 3 Conversion Flows | Flow Share |
|---|---|---|---|
| Coupon | 15% | 1. Main > Coupon | 14% |
| | | 2. Main > Product Info 1 > Main > Coupon | 11% |
| | | 3. Main > Product Info 1 > Product Info 2 > Main > Coupon | 5% |

Top Flows

| ▼ Rank | Flow | Flow Share |
|---|---|---|
| 1 | Main | 54% |
| 2 | Main > Coupon | 14% |
| 3 | Main > Product Info 1 > Product Info 2 | 12% |
| 4 | Main > Product Info 1 > Main > Coupon | 11% |

Detailed Card Stats: [ Main ]

Impressions: 12,455   Unique Viewers: 8,810   Response Rate: 46%

Stats by geography

Top Referrer Cards

1. Product Info 1 (32%)
2. Product Info 2 (68%)

Top Follow on Cards

1. Coupon (26%)
2. Product Info 1 (74%)

INTERACTIVE TEXT MESSAGE ADVERTISEMENTS

BACKGROUND

This disclosure is related to text message advertising.

Mobile phones are used for numerous types of communications. For example, a mobile phone can facilitate voice communication, web-based communications, and short messaging service (SMS) communications. Short messaging service communications (e.g., text messages) have become a part of life for many mobile phone users. As short messaging service messages have gained popularity, publishers have developed ways to monetize their content through SMS advertisements. For example, organizations like CNN and ESPN can provide news and sports updates in the form of text messages to users that subscribe to a subscription service. By appending advertisements to these updates, the subscription service can be provided to the user without charge from the publisher.

However, improving the success of SMS-based is a challenge because the amount of information that can be provided to the user is limited.

SUMMARY

Systems, methods and computer readable media for interactive text messages are provided. Example systems can include a response parsing engine and a text message page server. The response parsing engine can receive a text message response from a device through a communications interface and can identify an indicator associated with the text message response. The text message page server can identify a selected text message page based upon the indicator associated with the response and can send the selected text message page to the device through the communications interface.

Systems, methods and computer readable media for creating interactive text message advertisements are provided. Example systems can include a text message module creation interface and a text message module generator. The text message module creation interface can facilitate creation of a text message module associated with a text message advertisement. The text message module generator can receive text message module information from an advertiser through the text message module creation interface and can generate a text message module comprising links to a plurality of text message pages.

Example methods for providing interactive text message advertising can include: providing a text message landing page to a device, the text message landing comprising text outlining navigation instructions associated with retrieval of one or more text content options available for delivery to a user of the device; receiving a response from the device, the response comprising a text message indicating which of the one or more text content options is requested by the user; selecting a first text message page from among one or more text message pages based upon the text message associated with the response, each of the text message pages comprising text content associated with the one or more text content options included in the text message landing page; and communicating the selected first text message page to the device.

Example methods for creating interactive text message advertising can include: providing a text message advertisement creation interface to an advertiser; receiving a text message advertisement from the advertiser through the text message advertisement creation interface; providing a text message module creation interface to the advertiser, the text message module creation interface being operable to facilitate the creation of a text message module; receiving text message module information from the advertiser through the text message module creation interface; and generating a text message module comprising a text message menu interface, the text message menu interface comprising links to a plurality of text message pages based upon the text message module information received from the advertiser.

Other implementations are disclosed, including implementations directed to systems, methods, apparatuses, computer-readable mediums and user interfaces.

DETAILED DESCRIPTION

Interactive text message advertising can enable recipients of the text message advertisement to respond to the text message advertisement to interact with the advertisement. In some implementations, the response can include an indication of the particular information associated with the text message advertisement in which the recipient is interested. Moreover, the advertiser can create a hierarchy of text message pages through which the recipient of the text message advertisement can navigate, and the advertiser can specify conversion events whereby the advertiser pays for conversion events rather than mere views of the advertisement. Interactive text message advertisements can provide the ability for deeper relationship with the recipient of the text message advertisement and better understanding of the behavior of recipients of the text message advertisement.

Figure 1:
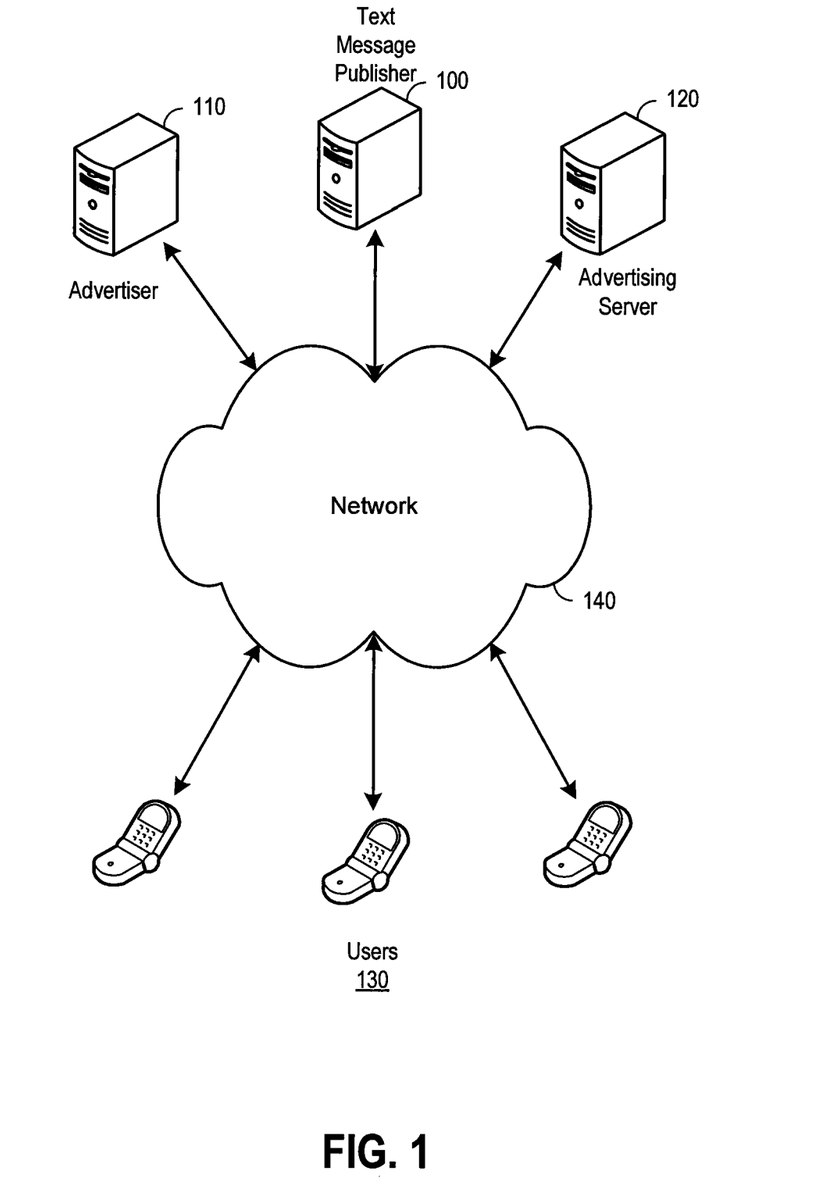
FIG. 1 is a block diagram of an example network architecture that can provide interactive text message advertisements.

FIG. 1 is a block diagram of an example network architecture that can provide interactive text message advertisements. An architecture can include an text message publisher 100, an advertiser 110, an advertising server 120, user device(s) 130 and a network 140. The text message publisher 100 can provide content to the user device(s) 130. The content distributed by the text message publisher 100 can include any content operable to be distributed using a text message format.

In various examples, a text message can include a short messaging service (SMS) message, an enhanced messaging service (EMS) message, or other communications that are transmitted according to a text-based messaging protocol. A text message can also include a text-based message that is transmitted to mobile devices over a Global System for Mobile communications (GSM) network, a time division multiple access (TDMA) network, a code division multiple access (CDMA) network or other network.

In some implementations, the text message publisher 100 can provide content to user device(s) 130 that subscribe to a service provided by the text message publisher 100 through a network 140. For example, a user device 130 might subscribe to a new service such as CNN or ESPN to receive news stories or sports scores. In other implementations, the text message publisher can be a text message search engine. The text message search engine, for example, can receive text message queries and to serve the queries in an text message format.

In some implementations, the text message publisher 100 can derive revenue to provide the content based upon advertisements provided to the user device(s) 130 with the content. In such implementations, the text message publisher 100 can supplement the content by, for example, appending or prepending interactive text message advertisements to content (e.g., news stories, sports scores, search results, etc.) when the content is served to user device(s) 130 (e.g., subscribers, searchers, etc.).

The interactive text message advertisements can be supplied to the text message publisher 100 by an advertising server 120. In some implementations, the interactive text message advertisement selected for inclusion with the content can be based upon the content being served to the user device(s) 130. For example, if the content being served to the user includes football scores, the selected interactive text message advertisement(s) could be related to football (e.g., sporting goods stores). In another implementation, the content can be associated with a demographic, and an advertisement can be selected based upon the demographic associated with the content. For example, if the content being served to the user is related to skateboarding, the demographic associated with skateboarding might be suburban teenagers. Suburban teenagers would probably not be interested in, for example, furniture advertisements, but might instead be interested in retailers that cater to their demographic.

The interactive text message advertisements can be created by an advertiser 110. The advertiser 110, in some implementations, can use a text message advertisement creation interface to interact with the advertising server 120 to create an text message advertisement. The advertiser 110 can additionally interact with a text message module creation interface to create a text message module associated with the text message advertisement. The text message module creation interface can enable the advertiser 110 to generate one or more text message pages that can be served to the user device(s) 130 based upon their response to the text message advertisement.

In some implementations, a response to the text message advertisement can result in a text message landing page being served to the user device 130 sending the response. The text message landing page can provide text to the user device 130 defining one or more options. The user device 130 can navigate through the text message module created by the advertiser by sending text messages to the advertising server 120 indicating a navigation selection. For example, a landing page might have four text message pages associated with the text message module, the "main page" (e.g., the landing page), an "information page," a "location page," and a "contact page." From the "main page" the user device 130, for example, might be provided with the option to request any of the other pages by responding to the advertising server 120 with a text message including the name of the page requested (e.g., "information," "location," or "contact"). In other examples, the user device 130 might send a text message to the advertising server 120 that includes certain codes or numbers associated with the text message pages in the text message module in order to request the respective text message pages.

Figure 2:
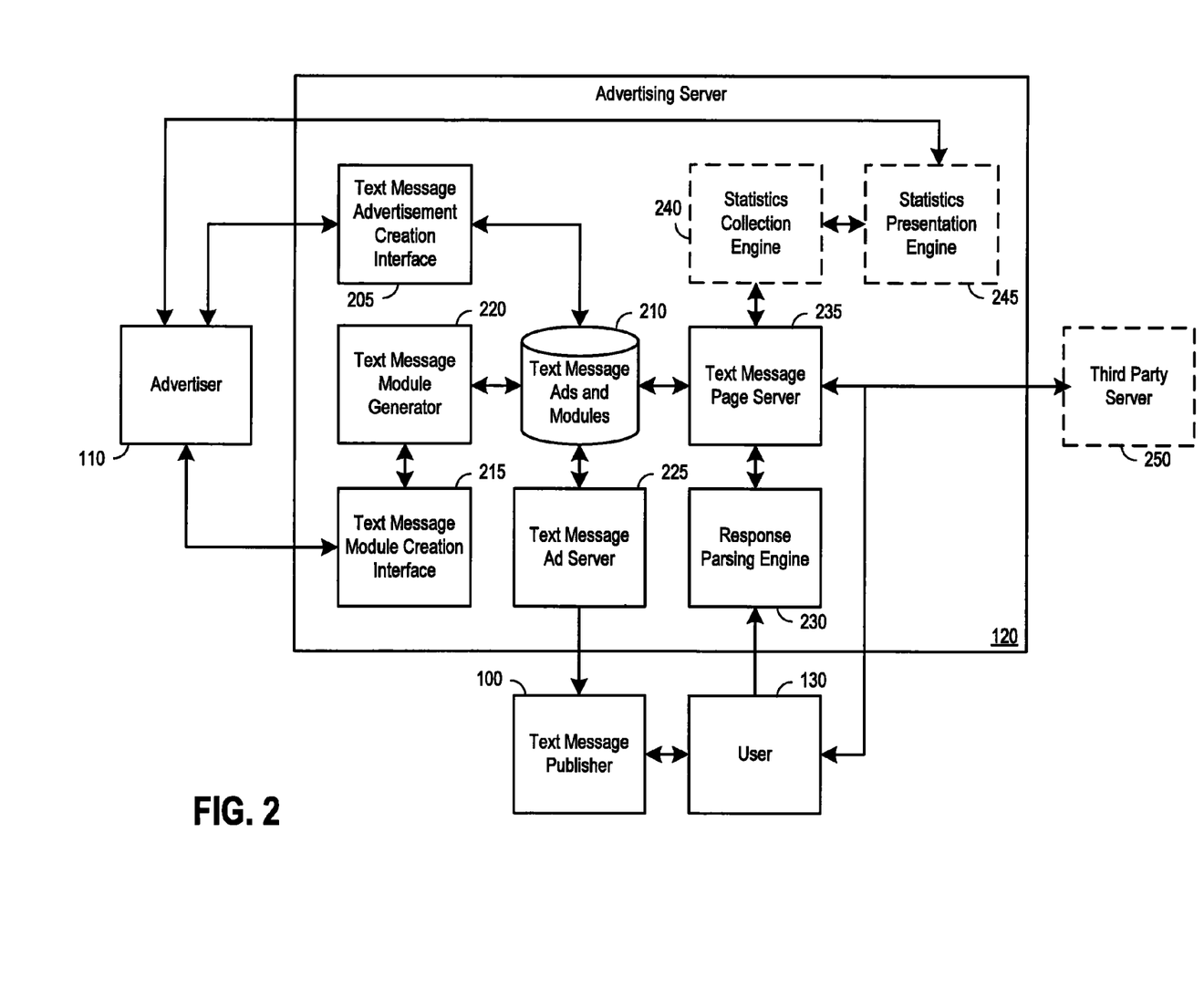
FIG. 2 is a block diagram of an example advertising server operable to provide interactive text message advertisements.

FIG. 2 is a block diagram of an example advertising server 120 operable to provide interactive text message advertisements. The advertising server 120 can include a text message advertisement creation interface engine 205. The text message advertisement creation interface engine 205 can provide an interface to the advertiser 110 for creating text message advertisements. The text message advertisements created by the advertiser 110 using the text message advertisement creation interface engine 205 can be stored in a text message advertisement data store 210.

In some implementations, the advertising server 120 can also include a text message module creation interface 215. The text message module creation interface 215 can receive text message module information from the advertiser 110. The text message module information can include information about the style and content of text message pages to be included in the text message module and can include information about which text message advertisement the text message module is to be associated.

In some implementations, the text message module creation interface 215 can pass the text message module information to an text message module generator 220. The text message module generator 220 can use the text message module information received from the text message module creation interface to generate a text message module. The text message module can include one or more text message pages associated with the text message module. The text message text pages can include content received from the advertiser 110. The text message text pages can also include textual navigation instructions that outline navigation options available to the user. The user can respond to the message by sending a text message to the advertising server 120 to select one of the options.

The text message page content can be limited to less than 160 characters (e.g., where the text message is an SMS message). In some implementations, because the textual navigation instructions are included in the 160 character maximum, the length of the content can be dynamically limited based upon the length of the navigation instructions (e.g., based on the number of navigation options) available to users receiving the interactive text message advertisement. In other implementations, a predefined number of characters can be reserved for content, while the remaining characters can be reserved for the textual navigation instructions. For example, the content might be limited to no more than 90 characters. In such an example, the navigation instructions would be limited to no more than 70 characters. In other implementations, multiple text messages can be sent to the user when the content associated with the text page does not fit within a single text message.

The text message module generator 220 can store the text message modules to a text message module data store 210. In the implementation shown, the text message modules are stored in the same data store 210 as the text message advertisements. However, in other implementations, the text message advertisements can be stored separately from the text message modules.

In some implementations, the advertising server 120 includes a text message advertisement server 225. The text message advertisement server 225 can receive requests for advertisements from a text message publisher 100. In some implementations, the request can include demographic or subject information. In such implementations, the text message advertisements server 225 can select an advertisement from the text message advertisement datastore 210 based upon the demographic, subject or location information included with the request. For example, location information can be based upon the area code associated with the user sending the request, and the advertisements served to the user can be targeted based upon the location of the user. In some implementations, a selected interactive text message advertisement can be returned to the text message publisher 100. In other implementations, the selected interactive text message advertisement can be communicated directly to the user device 130.

In those implementations where the selected interactive text message advertisement is sent to the text message publisher 100, the text message publisher 100 can append or prepend the selected interactive text message advertisement to the content being sent to the user device 130. For example, if the content included football scores for a particular team, an interactive text message advertisement for sports apparel could be included in the text message being sent to the user device 130.

The interactive text message advertisement sent to the user device 130 can include instructions for navigating to the text message landing page associated with the advertisement. For example, the instructions can provide a codeword or number that can be sent in the body of a text message to the advertising server in order to retrieve a text message landing page associated with the text message advertisement. After sending the codeword or number to the advertising server, the user device 130 receives the text message landing page associated with the advertisement. In some implementations, the codeword or number can identify the advertisement associated with the request. In other implementations, the advertisement can be identified by an identification associated with the device. For example, the advertising server can keep a record of which advertisements have been served to a device and can serve a landing page to the device based upon looking up which advertisements have been served to the user device 130 recently.

When the user device 130 provides a response to the advertising server 120, the response can be parsed by a response parsing engine 230. The response parsing engine 230 can operate to extract the text associated with the response. The text can be provided to a text message page server 235. In some implementations, the text message page server 235 can use the text associated with the text message to determine which page the user device 130 is requesting.

In some implementations, the text message page server 235 can also use a device identification associated with the device sending the request to determine which page the user device 130 is requesting. For example, the text message page server 235 can include a state machine indicating where the user is within the text message module. A request from the user device 130, therefore, in such implementations can request a text message page and that text message page can be dependant on a current text message page displayed to the user device 130.

The text message page server 235 can retrieve a text message page associated with the request based upon the text extracted by the response parsing engine 230. The text message page associated with the request can be retrieved, for example, from a text message module data store 510. The text message page server 235 can communicate the retrieved text message page to the user device 130. The text message page can include textual navigation instructions for selecting options to receive further text message pages associated with the text message module.

In some implementations, the advertising server 120 can include a statistics collection engine 240. In such implementations, the text message page server 235 can notify the statistics collection engine 240 when a new text message page is served to the user device 130. The notification can include information about which text page is being served to the user device 130.

The notification can also include a session identification and/or device identification. The session identification and/or device identification can enable the statistics collection server 240 to associate the text message page currently being served to the user device 130 with previous pages served to the user device 130.

The statistics collection engine 240 can analyze the session information and derive navigation statistics associated with text message modules served by the text message page server 235. In some implementations, the navigation statistics can be made available through the statistics presentation engine 245. The statistics presentation engine 245 can receive a statistics request from the advertiser 110. The request can indicate which of the statistics tracked by the statistics collection engine 240 should be served to the advertiser 110. In response to the statistics request, the statistics presentation engine 245 can retrieve statistics associated with the request and format the statistics for presentation to the advertiser 110.

In additional implementations, the text message page server 235 can communicate with a third party server. The communications to a third party server can be used, for example, to retrieve directions or address information. In other examples, the communications to a third party server can include an entry into a contest. In such examples, identifying information associated with the user device 130 can be derived based upon a device identification included in the user's response to a current text message page.

Figure 3:
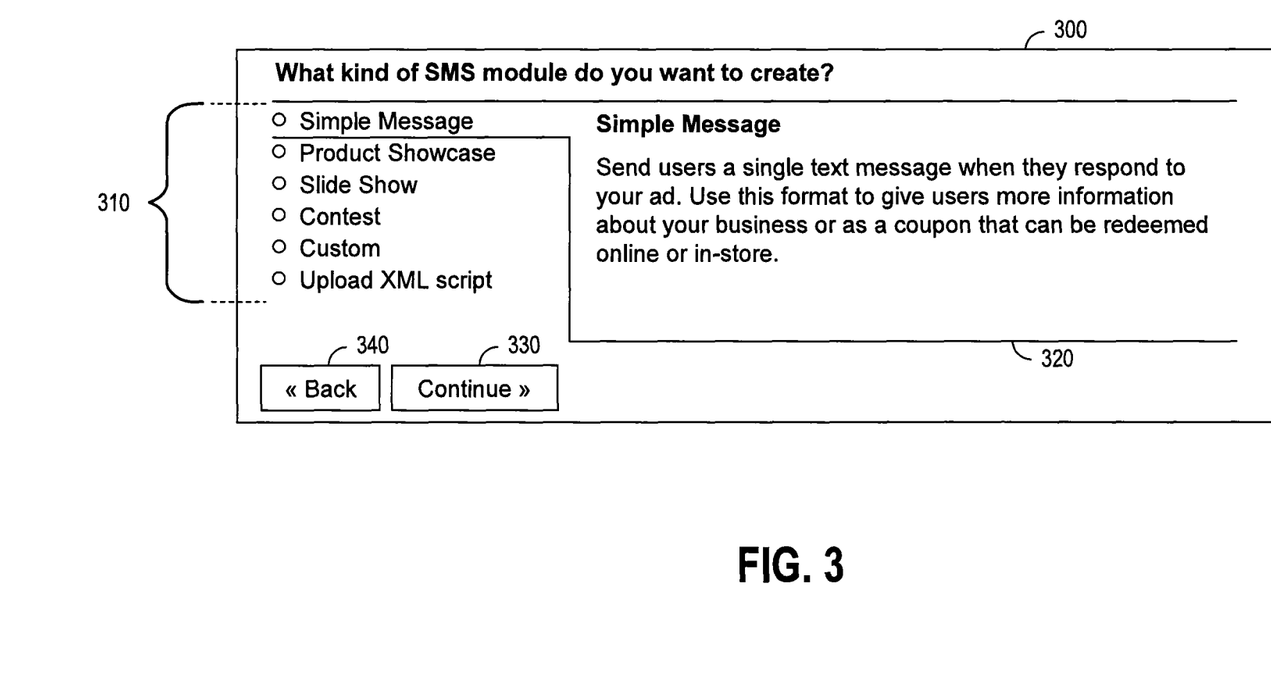
FIG. 3 is a screen shot of an example text message module creation interface used to create an interactive text message advertisement.

FIG. 3 is a screen shot of an example text message module creation interface used to create an interactive text message advertisement. In some implementations, an initial interface 300 can be provided to an advertiser to create a text message module associated with an interactive text message advertisement. The text message module can include a text message landing page and a number of text message pages. The text message landing page can provide an initial view of the text message module, while the text message pages can supplement the text message landing page with additional information and/or contact information.

The initial interface 300 can provide template selection representations 310 to the advertiser. The template selection representations 310 can provide pre-formatted text message modules for selection by the user. For example, as shown in FIG. 3, the templates selection representations 310 can include a "simple message" selection representation, a "product showcase" selection representation, a "slide show" selection representation, a "contest" selection representation, a "custom" selection representation, and an "upload XML script" selection representation. The "simple message" selection representation can include a single text message text page (e.g., an text message landing page) for distribution to users upon receipt of a response to an interactive text message advertisement. The "product showcase" selection representation can include a number of text message page representations branching from a text message landing page, whereby an advertiser can showcase their products. The "slide show" selection representation can include a series of text message pages that are accessible in serial order similar to a slideshow. The "contest" selection representation can include a text message page dedicated to providing instructions to the recipient on how to register for a contest. The "custom" selection representation can enable the advertiser to create a customized text message module if none of the other modules are suitable for the advertiser's purpose. The "upload XML script" selection representation can enable the advertiser to upload an XML script to serve as the text message module associated with the text message advertisement. In the case of an XML script, the interface can be operable to enable the advertiser to edit and/or debug the script. Other templates can be used.

In some implementations, the initial interface can include a template description 320 describing the formatting associated with the currently selected template 310. In the example of FIG. 3, the template description describes the formatting associated with a "simple message" template because the "simple message" selection representation is selected. The advertiser can select a "continue" button representation 330 to use the currently selected text message module template selection representation. The advertiser can select a "back" button representation 340 to return to an advertisement management interface.

Figure 4:
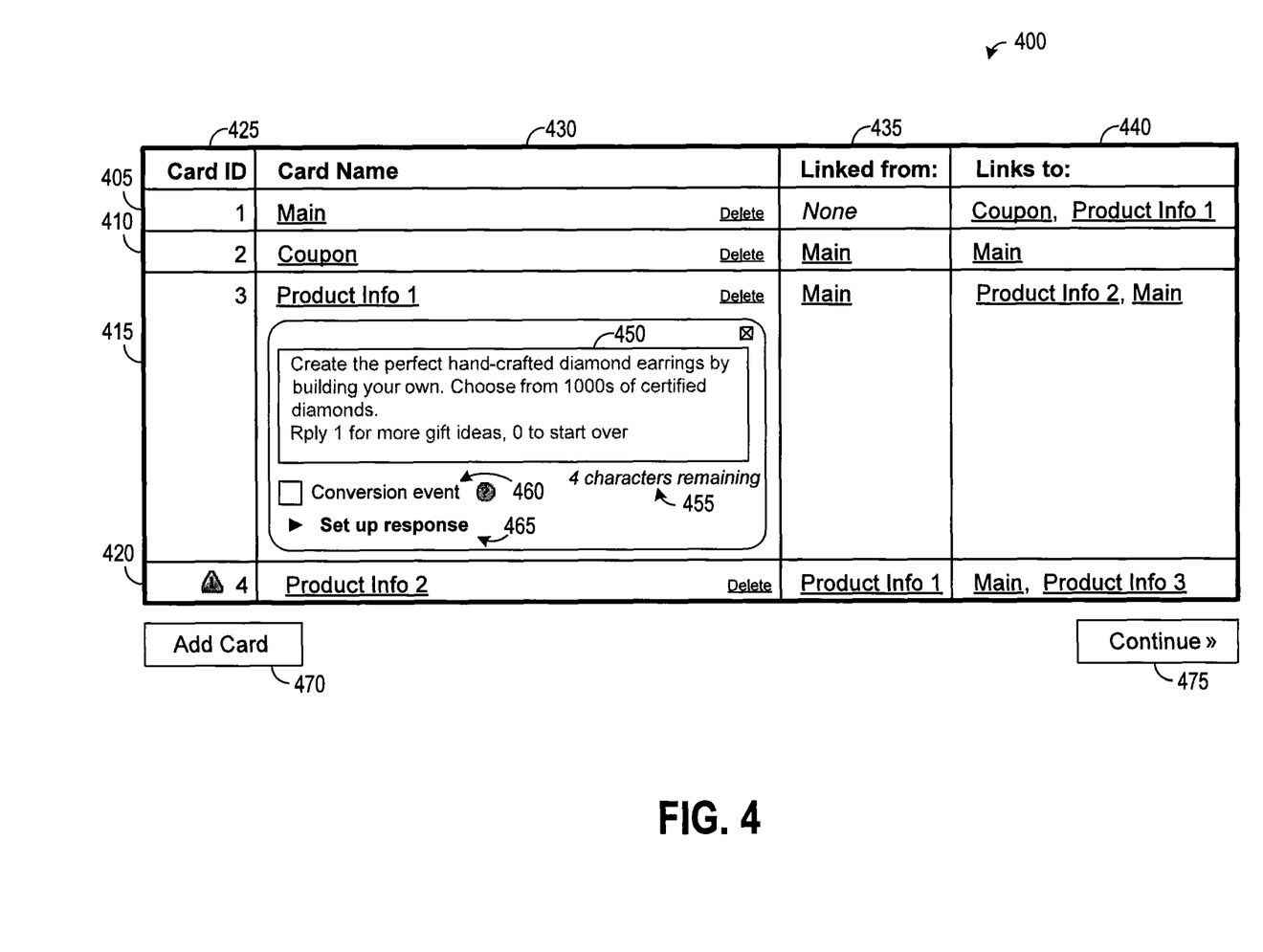
FIG. 4 is a screen shot of an example text message module editing interface used to edit a text message module.

FIG. 4 is a screen shot of an example text message module editing interface used to edit an interactive text message advertisement. The text message module can include a number of cards 405, 410, 415 and 420 that correlate to the text message pages that are included in the text message module. In this description, "cards" can refer to an abstraction of the text message pages, the abstraction being provided to the advertiser for editing the text message pages. The text message module can also include a number of columns. For example, the columns can include a "card ID" column representation 425, a "card name" column representation 430, a "linked from" column representation 435, and a "links to" column representation 440. The "card ID" column representation 425 can identify the particular card to facilitate location of the card by an text message page server. For example, card 405 can be identified by "card ID" column representation as card "1." The "card name" column representation 430 can identify a name associated with the card, facilitating identification of the card by the advertiser. The "linked from" column representation 435 can identify the other text message pages that link to the selected text message page. For example, card 410 is linked from the "main" text message page. The "linked to" column representation 440 can identify the text message pages to which the selected text message page links. For example, card 415 links to a "product info 2" text message page and a "Main" text message page.

In some implementations, a currently selected card 415 associated with a text message page can be expanded for editing. In the example of FIG. 4, card 415 is selected. Selecting a text message page can provide an editing interface 450 to facilitate changing the content associated with the text message page associated with the selected card 415. In some implementations, the editing interface 450 can include a length indicator 455. In some examples, the length indicator can indicate how many characters have been used. In the example of FIG. 4, the length indicator can indicate how many more characters can be used. The currently selected card can also be marked as a conversion event using conversion event selection representation 460, and a response can be set up using the "set up response" selection representation 465.

In some implementations, the editing interface 400 can include an "add card" button representation 470 and a "continue" button representation 475. The "add card" button representation 470 can be used to add a new card to the text message module. For example, if an advertiser would like to add a "Contact Us" text message page used to contact the advertiser, the advertiser could selected the "add card" button representation 470 to generate a shell for the new text message page. The "continue" button representation 475 can be used to finish the editing of the text message module and close the editing interface 400.

Figure 5:
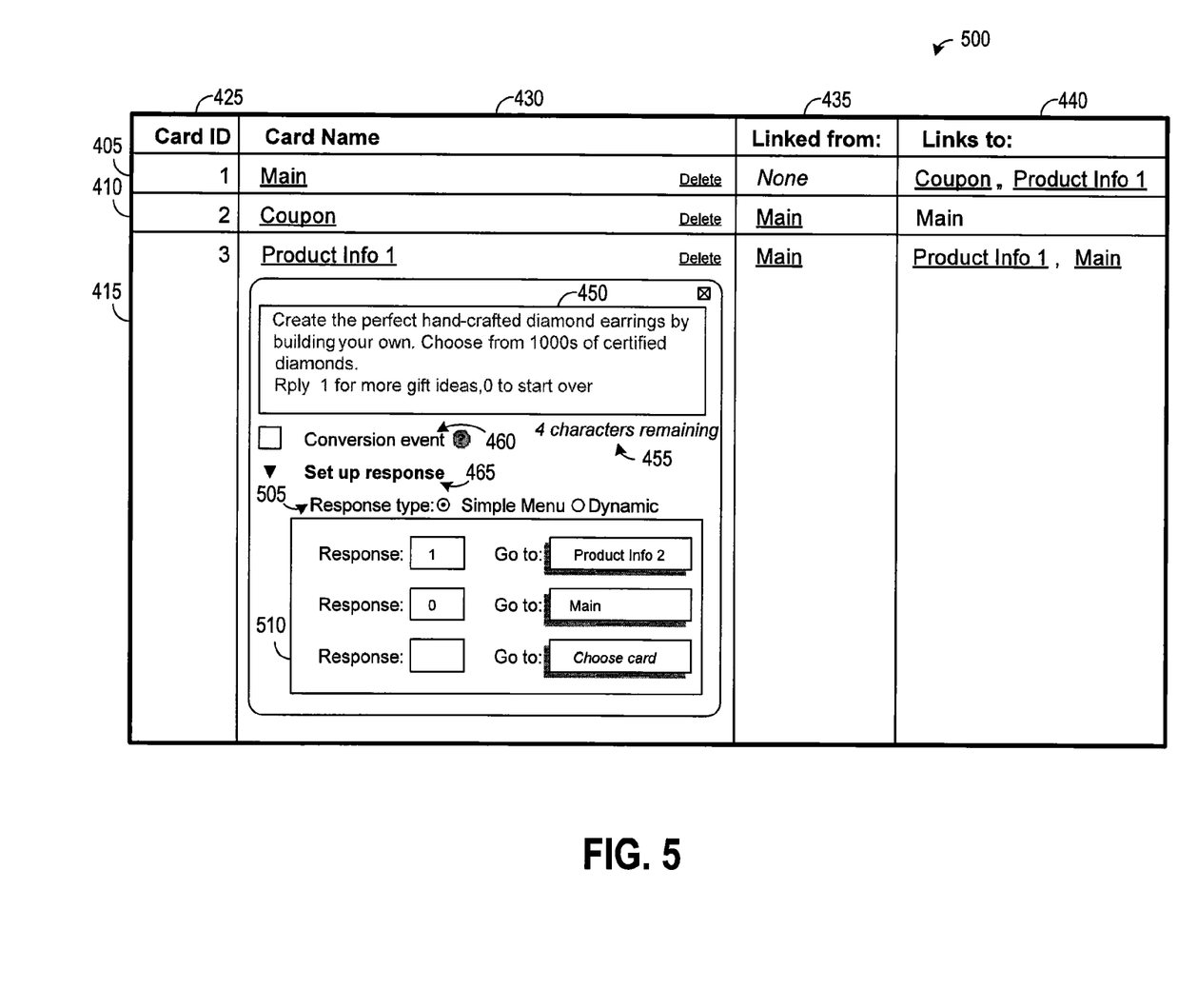
FIG. 5 is a screen shot of another example text message module editing interface including a response setup interface.

FIG. 5 is a screen shot of another example text message module editing interface 500 including a response setup interface. The response setup interface can include a "response type" selection representation 505 and a response setup interface 510. In some implementations, the "response type" selection representation can include a "simple menu" selection and a "dynamic" selection. The "simple menu" selection can display the response setup interface 510 shown in FIG. 5.

In some implementations, the response setup interface 510 can facilitate setting up those text message pages to which specific responses are linked. In the example shown in FIG. 5, the response setup interface 510 indicates that a response of "1" links to a "Product Info 2" text message page, while a response of "0" links to a "Main" text message page. In various implementations, the selection of the linked page can be from a pulldown menu, pop-up menu, or can be entered manually by the advertiser. In some examples, the responses can be limited to numeric values, while in other examples the responses can be character or alphanumeric responses.

Figure 6:
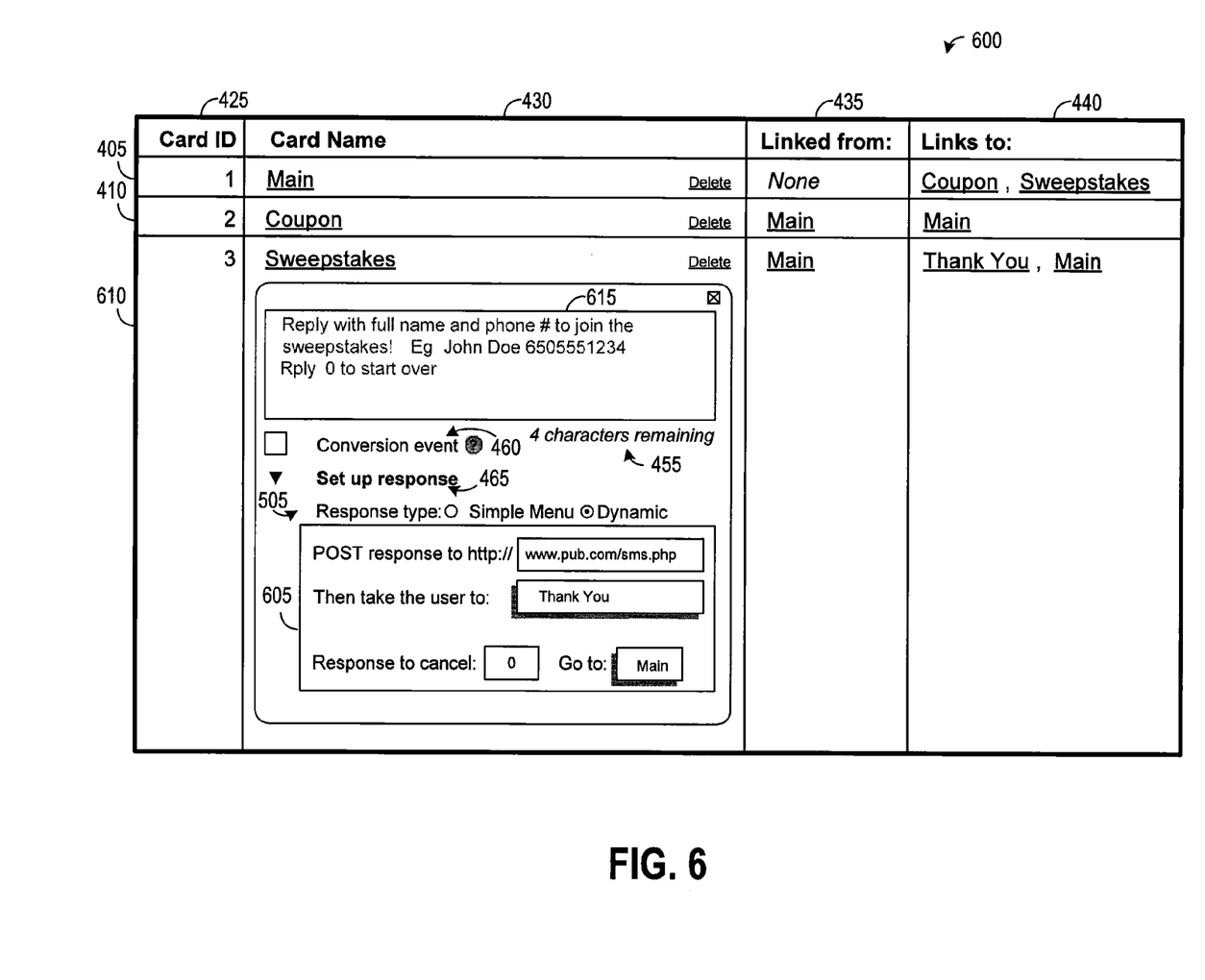
FIG. 6 is a screen shot of another example text message module editing interface including a dynamic response setup interface.

FIG. 6 is a screen shot of another example text message module editing interface 600 including a dynamic response setup interface 605. In some implementations, a dynamic response setup interface 605 can facilitate the creation of a card whereby a response can result in communication of data to a third party server. In the example of FIG. 6, a user response to the "Sweepstakes" card 610 can indicate sweepstakes entry information. For example, if the user responds with "0" the text message page server will return the user to the "Main" text message page. However, if the user enters another response, the response can be posted to a third party server (e.g., a sweepstakes server). The advertiser can provide the user with directions for entering a sweepstakes, for example, using the content editing interface 615. In other examples, the third party server can provide the user with directions to a location that is the subject of the advertisement based upon the user entering his or her address. Other solutions using the dynamic response and third party servers can be attained.

Figure 7:
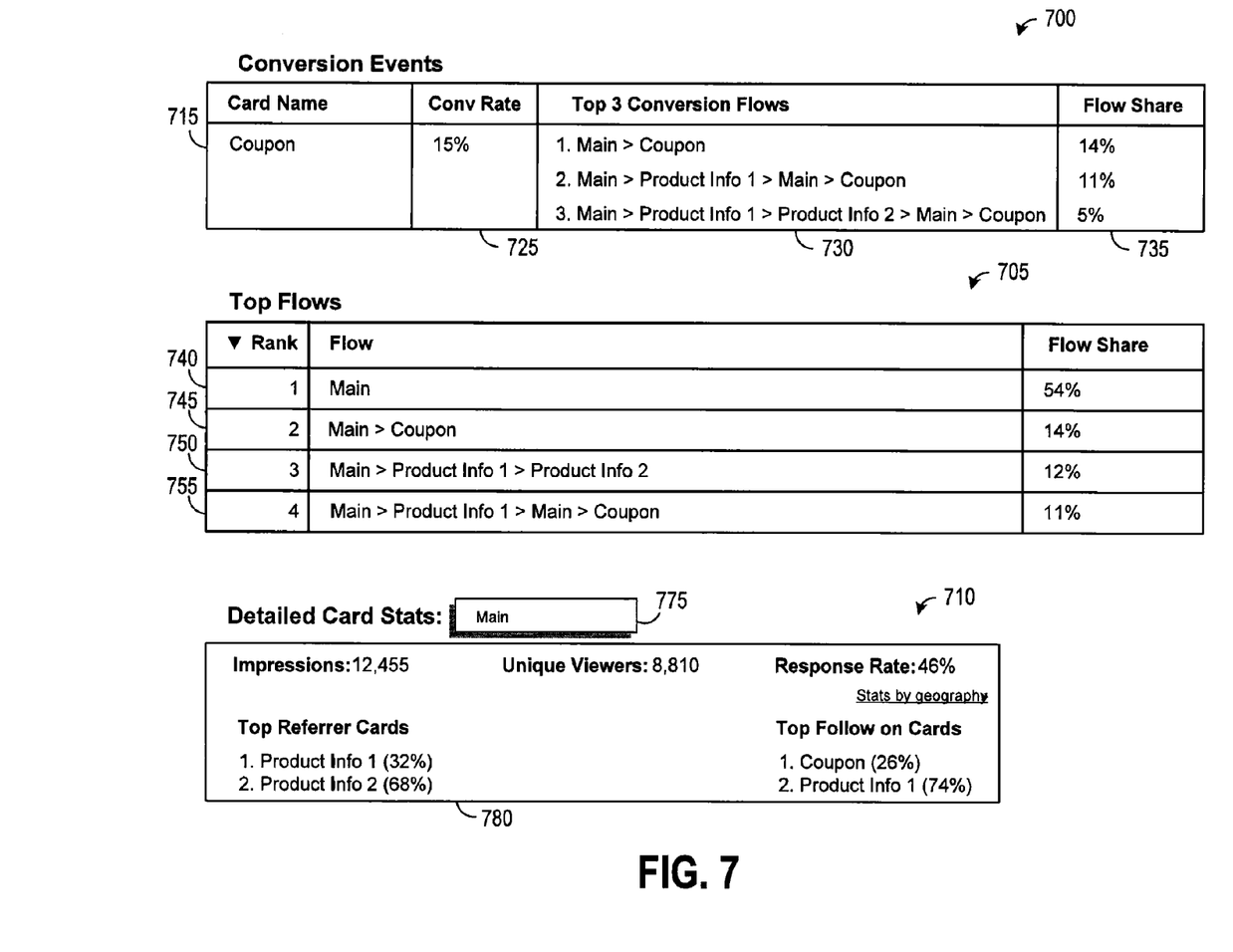
FIG. 7 is a screen shot of an example statistical analysis interface used to review the statistics associated with a text message module.

FIG. 7 is a screen shot of an example statistical analysis interface used to review the statistics associated with a text message module. In various implementations, the statistical analysis interface can include a "Conversion Events" presentation 700, a "Top Flows" presentation 705, a "Detailed Card Stats" presentation 710, or combinations thereof. Other presentations can be included based upon the particular requirements of the advertiser and/or statistics collection engine.

In some implementations, the "Conversion Events" presentation 700 can provide statistics related to conversion events. The conversion events can be recognized based upon which of the text message pages included in the module were marked by the advertiser as conversion events, when the advertiser created (or subsequently edited) the text message module. The text message page 715 (e.g., card) which was marked as conversion events can be listed underneath a header row. A "Conversion Rate" representation 725 can be displayed to the advertiser. The conversion rate can measure the frequency with which users receiving the interactive text message advertisement navigate the advertisement to a conversion event. In this example, the conversion rate is 15%. Thus, 15% of the users receiving the advertisement proceed to the conversion page (e.g., the text message page named "Coupon").

A "Top Conversion Flows" representation 730 can indicate the top three paths associated with conversion events. In this example, the top 3 paths navigated by users through to conversion include: 1) "Main>Coupon" (e.g., indicating that the most traveled conversion path was directly from the text message landing page (e.g., "Main") to the conversion page); 2) "Main>Product Info 1>Main>Coupon"; and 3) "Main>Product Info 1>Product Info 2>Main>Coupon." The paths associated with the most frequently used conversion paths can be updated periodically. In some implementations, a "Flow Share" representation 735 can indicate what percentage of the total number of conversions result from the associated path. For example, the path "Main>Coupon" accounts for 14% of the conversion events collected.

The "Top Flows" presentation 705 can provide statistics related to the flows (e.g., paths) for the users interacting with the interactive text message advertisement. In some implementations, the flows 740, 745, 750, 755 can be order based upon their popularity. In this example, the most popular flow only includes the text message page labeled "Main." The advertiser can review the chart to determine that 54% of the respondents to the interactive text message advertisement visit the text message page labeled "Main" (e.g., the text message landing page) and then discontinue their viewing of the interactive text message advertisement.

The "Detailed Card Stats" presentation 710 can provide statistics associated with a currently selected card. In some implementations, the currently selected card can be selected using a card selection representation 775. In this example, the currently selected card is the "Main" text message page. A statistics viewing environment 780 can display the card currently displayed by the card selection representation 775. In various implementations, the total number of impressions, the top referrer cards, the number of unique views, the response rate, the top follow-on cards, or combinations thereof can be displayed to the advertiser. Such statistics can facilitate the advertiser's review of the performance of the interactive text message advertisement.

Figure 8:
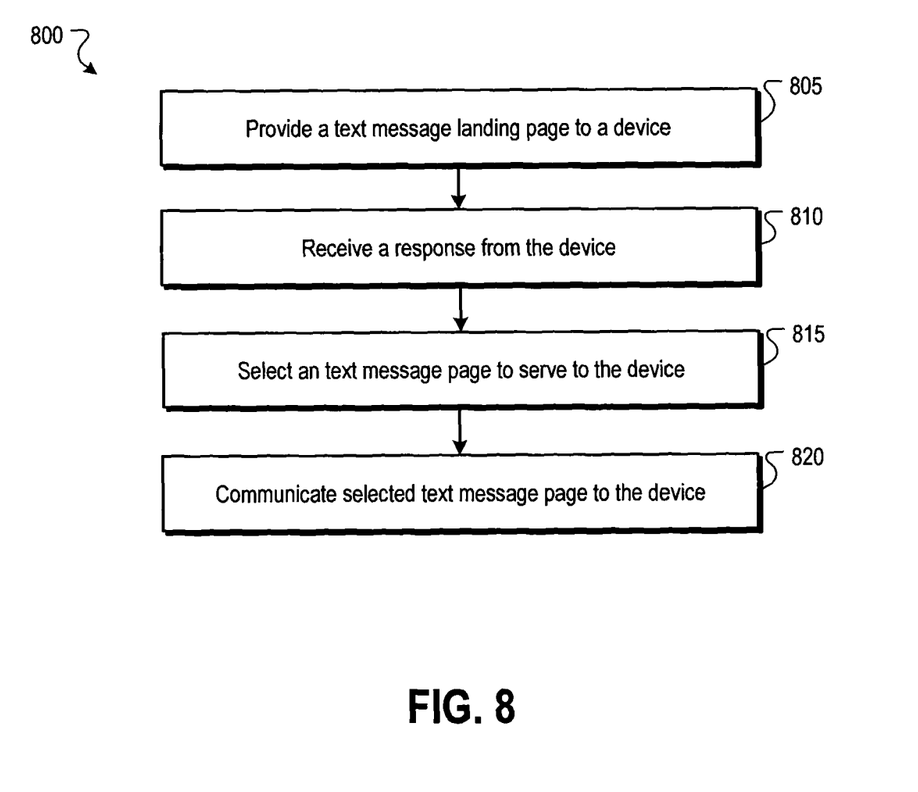
FIG. 8 is a flowchart of an example method for providing interactive text message advertising.

FIG. 8 is a flowchart of an example method 800 for providing interactive text message advertising. At stage 805, a text message landing page is provided to a user device. The text message landing page can be provided to the user device, for example, by a text message page server (e.g., text message page server 235 of FIG. 2). The text message landing page can be provided based upon receipt of a code associated with the text message module that includes the text message landing page. In some implementations, the different text message modules can be created based upon the area code associated with the requesting device. Thus, different text message landing pages can be served based upon the location of the user. In additional implementations, the text message landing page can provide navigation instructions to the user to instruct the user how to interact with the advertising server.

At stage 810, a response can be received from the device. The response can be received from the device, for example, by a response parsing engine (e.g., response parsing engine 230 of FIG. 2). In some implementations, the response parsing engine can extract the text associated with the response from the remainder of the text message. For example, if a user sent a text message to an advertising server that included the text "1," the response parsing engine could extract the text "1" from the message.

At stage 815, a text message page can be selected for serving to the device. The text message page can be selected for serving to the device, for example, by a text message page server (e.g., text message page server 235 of FIG. 2). A response parsing engine can provide the extracted text from the text message received from the device to the text message page server. In some implementations, the text message page server can retrieve an text message page from an text message module data store (e.g., text message module data store 210 of FIG. 2) based upon the text associated with the text message received from the device. In other implementations, the text message page server can retrieve a text message page from the text message module data store based upon the text associated with the text message and based upon a session identification or device identification. The session identification or device identification can facilitate identification of the particular text message module associated with the text message received from the device.

At stage 820, a selected text message page can be communicated to the device. The selected text message page can be communicated to the device, for example, by a text message page server (e.g., text message page server 235 of FIG. 2). In some implementations, the text message page can be served directly to the device by the text message page server associated with an advertising server. In other implementations, the text message page can be served to another server before being served to the device.

In some implementations, the text message page server, upon receiving a text message page request through a response parsing engine can communicate the request to a collection engine (e.g., statistics collection engine 240 of FIG. 2). In such implementations, the collection engine can separate the collected information into categories based upon statistics tracked by the collection engine. The statistics tracked by the collection engine can be specified by and advertiser or by an administrator of the advertising server.

In additional implementations, the text message page server can forward information to a third party server (e.g., third party server 250 of FIG. 2) based upon the text message module associated with the request. For example, a device could provide a user name and telephone number for inclusion into a sweepstakes, and the text message page server could forward the name and telephone number to a third party server based upon the text message module associated with the request. In another example, a device could provide a location (e.g., address) associated with the device, and the text message page server can forward the location to a third party server to facilitate the provision of directions to the user (e.g., to locate an advertiser's storefront).

Figure 9:
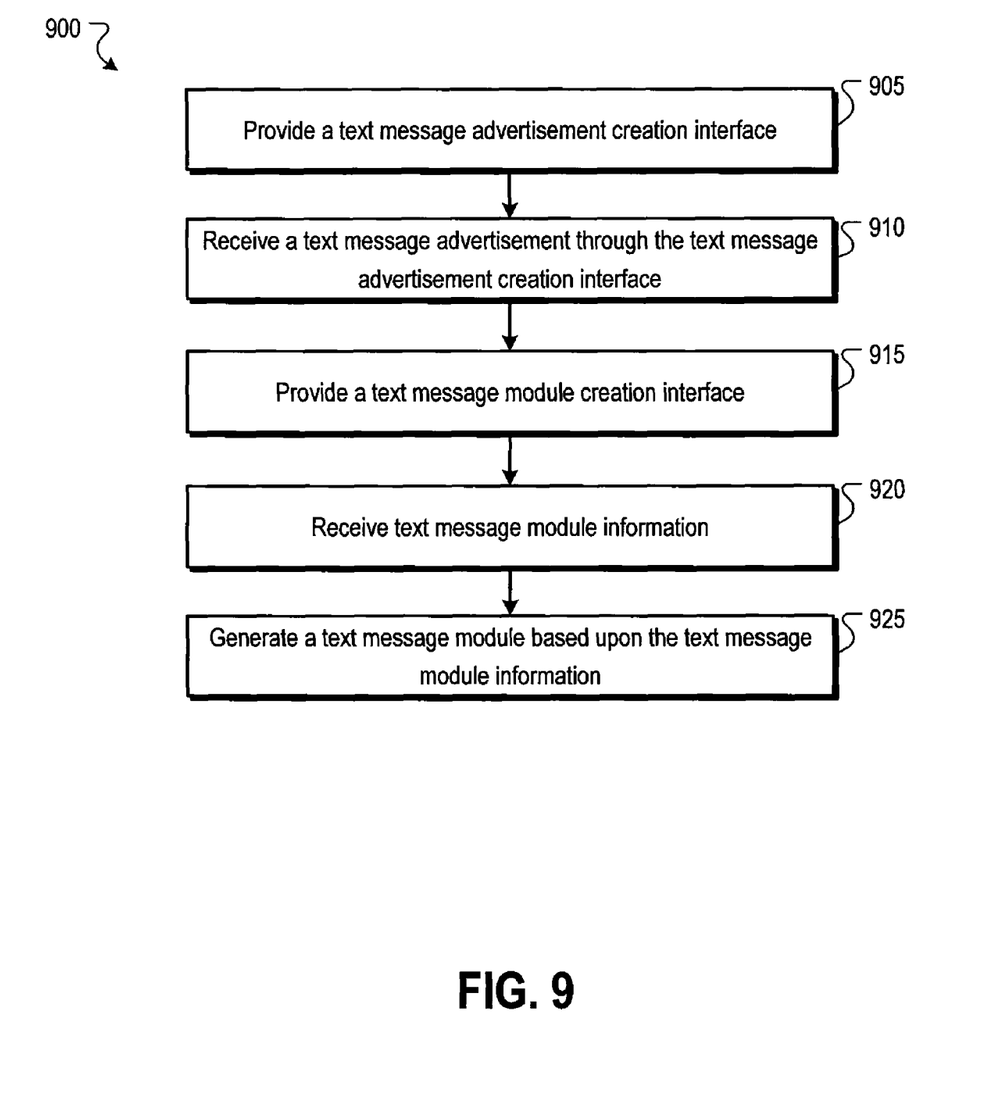
FIG. 9 is a flowchart of an example method for creating interactive text message advertising.

FIG. 9 is a flowchart of an example method 900 for creating interactive text message advertising. At stage 905, a text message advertisement creation interface can be provided to the device. The text message advertisement creation interface can be provided to the device, for example, by an text message advertisement creation interface engine (e.g., text message advertisement creation interface 205 of FIG. 2). In various implementations, the text message advertisement creation interface is optional, because the text message advertisement is pre-existing and/or being served by another advertising server. In some examples, the text message advertisement creation engine can facilitate the entry of text associated with a text message advertisement to be distributed to mobile devices with a specified demographic or location.

At stage 910, a text message advertisement can be received through the text message advertisement creation interface. The text message advertisement can be received through the text message advertisement creation interface, for example, by an text message advertisement creation interface engine (e.g., text message advertisement creation interface 205 of FIG. 2). In various implementations, receiving the text message advertisement is optional, because the advertisement was previously created and/or is being served by another advertising server.

At stage 915, a text message module creation interface is provided. The text message module creation engine can be provided, for example, by a text message module creation interface engine (e.g., text message module creation interface 215 of FIG. 2). In various implementations, the text message module creation interface engine can facilitate the creation of a text message module linked to a text message advertisement, thereby creating an interactive text message advertisement. The creation of a text message module can include the creation of one or more text message pages, including a text message landing page. The text message module can be navigated like a website when a user responds to the text message messages by selecting a navigation option outlines by navigation instructions included in the current text message. In some implementations, the text message module can include a state machine indicating where the user is within the text message module. A user's response to the advertising server can then be interpreted in light of the location of the user within the state machine. In other implementations, the text message module can include static links, whereby the link associated with a specified response is linked to a specific webpage regardless of the user's location within the text message module (e.g., the page currently being viewed by the user).

At stage 920, text message module information can be received. The text message module information can be received, for example, by a text message module creation interface engine (e.g., text message module creation interface 215 of FIG. 2) from an advertiser (e.g., advertiser 110 of FIG. 2). In some implementations, the text message module information can include text for inclusion in the text message pages sent to the user. The text message module information can also include specification of which of the text message pages are defined as conversion events by the advertiser, and specification of navigation instructions and response setup information. Response setup information can specify how to interpret a response from the user (e.g., which text message page to serve to the user based upon a specified response). In some implementations, the response setup can indicate that the response is a dynamic response or a simple message response. Other information can be included within the text message module information.

At stage 925, an text message module can be generated based upon the text message module information. The text message module can be generated, for example, by a text message module generator (e.g., text message module generator 220 of FIG. 2). The text message module generator can interpret the text message module information to generate the text message module for storage to a text message module data store (e.g., text message module data store 210). The text message module can include program code (e.g., XML script) indicating which text message pages to serve to the user and how to handle responses.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims. The same experimental techniques work for any web page, not merely advertising landing pages. Any web site owner can experimentally determine how good his or her web site design is and which web pages should be targeted for improvement. The web site owner merely needs to designate a test page and a goal page. A goal rate can be calculated as the percentage of browsing users who, having reached the test page, go on to reach the goal page. The goal rate can be interpreted as a measure of success. In this specification, in order to adopt the commonly used terminology, "landing page" is used to include all test pages whether or not arrived at through an advertisement, and "conversion page" is used to include all goal pages.

These and other implementations are within the scope of the following claims.

What is claimed is:

1. A computer-implemented method comprising:
transmitting, by a computer and to a device, a first SMS message for an advertisement, the first SMS message comprising text outlining navigation instructions for retrieval of one or more text content options available for delivery to the device, each navigation instruction including a corresponding text response for transmission from the device to the computer for requesting delivery of one of the one or more text content options, each text response corresponding to one of the text content options, each text content option being associated with the advertisement;
receiving, by the computer, a response from the device, the response comprising a second SMS message that includes a text response that corresponds to a selected navigation instruction;
selecting, by the computer, a first text message from among text messages based upon the text response included in the second SMS message, each of the text messages comprising text content associated with one of the one or more text content options, the first text message including text content associated with the text content option that corresponds to the text response included in the second SMS message; and
transmitting, by the computer, a third SMS message to the device, the third SMS message including the text content included in the first text message.

2. The method of claim 1, further comprising:
transmitting a text message advertisement based upon a text message search request received from the device, the text message advertisement being associated with the advertisement; and
receiving a request from the device in response to the text message advertisement;
wherein the first SMS message is provided in response to the request.

3. The method of claim 2, further comprising appending or prepending the text message advertisement onto an end or beginning of a text message sent to the device by a publisher.

4. The method of claim 2, further comprising selecting a text message advertisement based upon a location associated with the device.

5. The method of claim 1, further comprising designating one of the one or more text messages as a conversion message.

6. The method of claim 5, further comprising recording a conversion when a conversion message is sent to the device.

7. The method of claim 1, further comprising:
storing a path associated with the device to a stored path data store based upon each text message served to the device;
retrieving stored paths from a data store; and
transmitting statistics associated with stored paths to an advertiser.

8. The method of claim 1, transmitting information associated with the device to a web server based upon the response.

9. The method of claim 1, further comprising:
receiving a second response from the device;
selecting a second text message from among the text messages based upon the second response and based upon the third SMS message sent to the device; and
transmitting a fourth text SMS message to the device, the fourth SMS message including text content included in the second text message.

10. A system comprising:
a text message server operable to transmit a first SMS message for an advertisement to a device, the first SMS message comprising text outlining navigation instructions for retrieval of one or more text content options available for delivery to the device, each navigation instruction including a corresponding text response for transmission from the device to a communications interface for requesting delivery of one of the one or more text content options, each text response corresponding to one of the text content options, each text content option being associated with the advertisement;
a response parsing engine operable to receive a response from the device through the communications interface, the response comprising a second SMS message that includes a text response that corresponds to a selected navigation instruction, and to parse the second SMS message to identify an indicator of the text response; and
the text message server further operable to:
identify a selected text message from among text messages based upon the indicator identified by the response parsing engine, each of the text messages comprising text content associated with one of the one or more text content options, the selected text message including text content associated with the text content option that corresponds to the text response included in the second SMS message; and
transmit a third SMS message comprising the text content included in the selected text message to the device through the communications interface.

11. The system of claim 10, further comprising:
an advertisement server operable to transmit a text message advertisement based upon a text message search request received from the device, the text message advertisement defining navigation instructions associated with one or more options included in a text message module, selection of an option indicating which of the one or more text messages is the selected text message, the text message advertisement being associated with the advertisement.

12. The system of claim 11, wherein the text message advertisement is prepended or appended to a beginning or end of a text message sent to the device by a publisher based upon the device being registered with the publisher to receive text messages.

13. The system of claim 11, wherein the advertisement server is operable to select the text message advertisement to provide to the device based upon a location associated with the device.

14. The system of claim 10, further comprising a conversion management engine operable to identify one or more of the text messages as a conversion text message and to store a conversion based upon the conversion text message being sent to the device.

15. The system of claim 10, further comprising:
a statistics collection engine operable to store path information associated with the device based upon which text messages are provided to the device; and
a statistics presentation engine operable to retrieve path information from the statistics collection engine and to transmit statistics associated with the retrieved path information to an advertiser.

16. The system of claim 10, wherein the response comprises an indicator operable to indicate which of the one or more text messages are selected.

17. The system of claim 10, further comprising a web interface engine operable to transmit information associated with the device to a web server based upon the response.

18. A computer-implemented method comprising:
transmitting, by a computer, an SMS message advertisement creation interface to an advertiser;
receiving, by the computer, an SMS message advertisement from the advertiser through the SMS message advertisement creation interface;
transmitting, by the computer, an SMS message module creation interface to the advertiser, the SMS message module creation interface being operable to facilitate the creation of a text message module;
receiving, by the computer, text message module information from the advertiser through the SMS message module creation interface, the text message module information comprising a first text message and a second text message, the first text message linking to the second text message; and
generating, by the computer, a text message module comprising a text message menu interface, the text message menu interface comprising links to a plurality of text messages based upon the text message module information received from the advertiser, the links including a link from the first text message to the second text message, the first text message including navigation instructions for retrieval of the second text message and at least one of the plurality of text messages, each navigation instruction including a text response for transmission from a client device to the computer for retrieval of a corresponding text message, each text response corresponding to a text message.

19. The method of claim 18, further comprising receiving an indication from the advertiser identifying one or more of the text messages as a conversion text message, transmitting the conversion text message comprising a conversion event.

20. The method of claim 19, further comprising receiving a maximum cost per conversion associated with the conversion event.

21. A system comprising:
one or more computers comprising:
an SMS message module creation interface operable to facilitate creation of a text message module associated with a text message advertisement; and
an SMS message module generator operable to receive text message module information from an advertiser comprising instructions for content to be included within a plurality of text messages associated with the text message module, the text messages being operable to be linked to each other based upon the text message module information received from the advertiser, the text message information being received through the SMS message module creation interface and the text message module being operable to generate the text message module associated with the text message advertisement based upon the text message module information;

wherein the text message module information comprises a first text message and a second text message, the first text message linking to the second text message, the first text message including navigation instructions for retrieval of the second text message and at least one additional text message, each navigation instruction including a text response for transmission from a client device to the computer for retrieval of a corresponding text message, each text response corresponding to a text message.

22. A non-transitory computer storage medium encoded with a computer program, the program comprising instructions that when executed by data processing apparatus cause the data processing apparatus to perform operations comprising:

transmitting a first SMS message for an advertisement to a device, the first SMS message comprising text outlining navigation instructions for retrieval of one or more text content options available for delivery to the device, each navigation instruction including a corresponding text response for transmission from the device to the computer for requesting delivery of one of the one or more text content options, each text response corresponding to one of the text content options, each text content option being associated with the advertisement;

receiving a response from the device, the response comprising second SMS message that includes a text response that corresponds to a selected navigation instruction;

selecting a first text message from among text messages based upon the text response included in the second SMS message, each of the text messages comprising text content associated with one of the one or more text content options, the first text message including content associated with the text content option that corresponds to the text response include in the second SMS message; and transmitting a third SMS message to the device, the third SMS message including the text content included in the first text message.

23. A non-transitory computer storage medium encoded with a computer program, the program comprising instructions that when executed by data processing apparatus cause the data processing apparatus to perform operations comprising:

transmitting an SMS message advertisement creation interface to an advertiser;

receiving an SMS message advertisement from the advertiser through the SMS message advertisement creation interface;

transmitting an SMS message module creation interface to the advertiser, the SMS message module creation interface being operable to facilitate the creation of a text message module;

receiving text message module information from the advertiser through the SMS message module creation interface, the text message module information comprising a first text message and a second text message, the first text message linking to the second text message; and generating a text message module comprising a text message menu interface, the text message menu interface comprising links to a plurality of text messages based upon the text message module information received from the advertiser, the links including a link from the first text message to the second text message, the first text message including navigation instructions for retrieval of the second text message and at least one of the plurality of text messages, each navigation instruction including a text response for transmission from a client device to a computer for retrieval of a corresponding text message, each text response corresponding to a text message.

* * * * *

UNITED STATES PATENT AND TRADEMARK OFFICE
CERTIFICATE OF CORRECTION

PATENT NO. : 8,521,581 B2  
APPLICATION NO. : 12/041383  
DATED : August 27, 2013  
INVENTOR(S) : Belwadi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this  
Tenth Day of February, 2015

Michelle K. Lee  
*Deputy Director of the United States Patent and Trademark Office*